United States Patent [19]
Sazhin et al.

[11] Patent Number: 5,849,429
[45] Date of Patent: Dec. 15, 1998

[54] PURIFICATION PROCESS FOR LITHIUM BATTERY ELECTROLYTES

[75] Inventors: Sergey V. Sazhin; Mikhail Yu. Khimchenko; Yevgeniy N. Tritenichenko, all of Suwon, Rep. of Korea

[73] Assignee: Samsung Display Devices Co., Ltd., Kyungki-do, Rep. of Korea

[21] Appl. No.: 731,960

[22] Filed: Oct. 23, 1996

[51] Int. Cl.$^6$ .......................... H01M 10/40; H01M 10/42
[52] U.S. Cl. .......................... 429/49; 429/194; 429/188
[58] Field of Search .................... 210/757, 758; 429/49, 194, 197, 188

[56] References Cited

U.S. PATENT DOCUMENTS

| | | | |
|---|---|---|---|
| 3,463,606 | 8/1969 | Smit et al. | 23/89 |
| 3,639,174 | 2/1972 | Kegelman | 429/194 |
| 4,118,550 | 10/1978 | Koch | 429/194 |
| 4,308,324 | 12/1981 | Newman | 429/188 |
| 4,642,192 | 2/1987 | Heskett | 210/638 |
| 4,895,778 | 1/1990 | Nalewajek | 429/188 |
| 5,154,990 | 10/1992 | Plichta et al. | 429/191 |
| 5,300,376 | 4/1994 | Plichta et al. | 429/197 |
| 5,368,958 | 11/1994 | Hirai et al. | 429/211 |

*Primary Examiner*—Stephen Kalafut
*Assistant Examiner*—Carol Chaney
*Attorney, Agent, or Firm*—Christie, Parker & Hale, LLP

[57] ABSTRACT

A process for purification of lithium battery electrolyte solutions is provided whereby the concentrations of trace amounts of impurities such as water in the electrolyte solutions can be reduced. Such electrolyte solutions generally include at least one lithium salt solute contained in at least one organic solvent. Lithium and a second metal with which lithium is capable of intercalating are first placed in electrical contact with one another and then placed in the electrolyte solution. Preferably, aluminum is used as the second metal and the two metals are provided as separate layers that are pressed together in a rolling mill to form a bimetallic sheet. The solution containing the bimetallic sheet is agitated to encourage the reactions which reduce the levels of impurities such as water in the electrolyte solution. The resulting purified solution is then filtered to remove any remaining metal or reaction products. The resulting purified electrolyte solution can be used to make lithium batteries having improved cycling characteristics over batteries using unpurified electrolyte solution.

34 Claims, 1 Drawing Sheet

PURIFICATION PROCESS FOR LITHIUM BATTERY ELECTROLYTES

FIELD OF THE INVENTION

This invention relates to an improved process for purification of a lithium battery electrolyte solution. More particularly, it relates to a method for removing trace amounts of impurities such as water from lithium battery electrolyte solutions.

BACKGROUND OF THE INVENTION

Lithium batteries are useful because they have a high energy density and can be recharged over several cycles. However, the cycling performance of rechargeable lithium batteries can be substantially affected by the purity of the electrolyte solutions used in those batteries. A battery using an electrolyte solution contaminated with impurities such as water will have poor cycling characteristics. Conversely, by reducing the impurities found in the electrolyte solution, the cycling characteristics and the useful life of a lithium battery can be greatly extended.

Trace amounts of water have proven to be an impurity that is particularly difficult to remove from organic electrolyte solutions. Trace amounts of water can promote a negative electrolyte decomposition process that decreases the battery storage and cycle life behavior.

Some past methods for purification of lithium battery electrolyte solutions are described in U.S. Pat. No. 4,308,324 to Newman. According to the Newman patent, an electrolyte solution can be purified by mixing the electrolyte solution with a lithium mercury amalgam provided in liquid form and then agitating the mixture. The process of the Newman patent also includes an optional step of aiding an oxidizing agent to the electrolyte solution. One problem with the Newman process is that both its reactants and products contain mercury which is highly toxic. The use of such materials demands extreme caution in both performing the process and in disposing the byproducts of the process.

SUMMARY OF THE INVENTION

According to the invention, a lithium battery electrolyte solution made up of at least one lithium salt solute contained in at least one organic solvent is purified of impurities such as water. A bimetallic construct of lithium and a second metal with which lithium is capable of intercalating is used to purify the electrolyte solution. First the lithium and the second metal are placed in electrical connection with one another. Preferably, the electrical connection is provided by direct contact between a first layer of lithium and a second layer of the second metal. Alternatively, a first layer of lithium is placed in electrical contact with a second layer of the second metal by the use of a short circuit made of a grid from a third metal that will not intercalate with lithium.

The electrolyte solution is placed in contact with the bimetallic construct in a pressure vessel in which the electrolyte solution is agitated. As the lithium and the second metal intercalate and react, impurities such as water are removed from the electrolyte solution. In particular, water is broken down by the reactions to form hydrogen gas and lithium hydroxide. The purified solution is then filtered to remove any remaining metals and any reaction products.

Lithium batteries formed from the resulting purified electrolyte solution have improved cycling performance over batteries made from the unpurified electrolyte solution. Furthermore, according to the present invention, lithium battery electrolyte solutions can be purified without the use of highly toxic mercury compounds and without the production of highly toxic mercury byproducts as is often the case with prior art purification processes.

BRIEF DESCRIPTION OF THE DRAWINGS

Other features, aspects and advantages of the present invention will be more fully understood when considered with respect to the following detailed description, appended claims, and accompanying drawings where:

DETAILED DESCRIPTION

Figure 1:
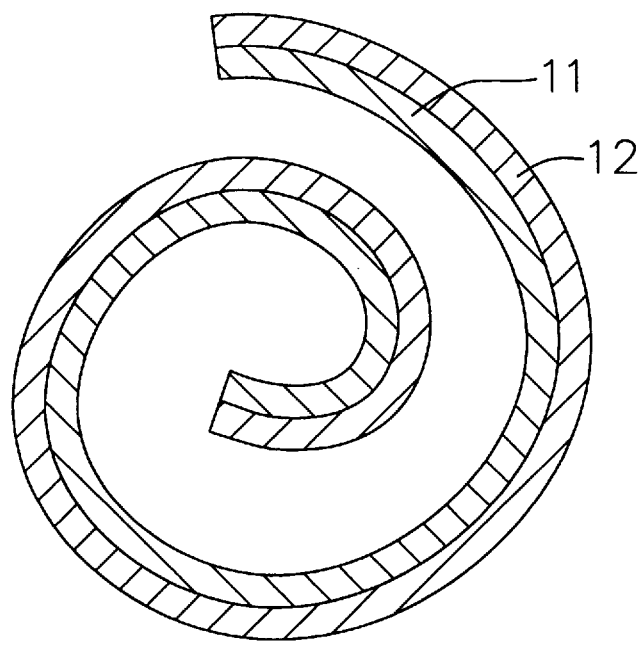
FIGS. 1 and 2 are sectional views of two different bimetallic constructs as used in the present invention.

Lithium battery electrolyte solutions generally comprise at least one lithium salt solute contained in at least one organic solvent. Water is an undesirable impurity in such electrolyte solutions. The water content of an unpurified electrolyte solution is generally at least about 20 ppm and can even be as high as over 165 ppm.

According to the present invention for purifying lithium battery electrolyte solutions, lithium metal is placed in the electrolyte solution along with a second metal with which lithium is capable of intercalating. Such metals include magnesium, aluminum, zinc, gallium, silver, cadmium, indium, tin, antimony, platinum, gold, leaf and bismuth. Preferably, the lithium and second metal are first placed in electrical contact with one another and then placed in the electrolyte solution. The reaction is carried out in a vessel with constant agitation such as by stirring to continually bring new parts of the solution into contact with the metal surfaces. Alternatively, the solution may be pumped over a bimetallic construct of lithium and the second metal, either in a once-over system or with recycling. After removal of water the purified solution is filtered.

The lithium and the second metal electrochemically react with one another to destroy impurities such as water in the electrolyte solution with high efficiency. It is believed that the first electrochemical reaction occurs on the surface of the lithium and involves the dissolution of lithium to form a lithium ion according to the reaction: $Li-e^- \rightarrow Li^+$. The conjugated second reaction is the intercalation of the lithium ion to become alloyed with the second metal on the electrode formed from the second metal: $M+xLi^++xe^- \rightarrow Li_xM$. These reactions promote the disassociation of water on both paris of the bimetallic construct to generate hydrogen and lithium hydroxide (LiOH).

The preferred metals for use as the second metal can generally be divided into two groups. The first group of metals comprises gallium, silver, indium, tin, antimony, platinum, gold, lead and bismuth. The second group of metals comprises magnesium, aluminum, zinc and cadmium. Metals from the second group of metals are generally preferred because they can react with water also. The most preferred metal is aluminum.

It is believed that a bimetallic construct of lithium and a metal from the first group of metals reacts with impurities such as water according to the following reaction wherein M is a metal selected from the first group mentioned above.

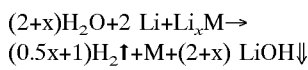

It is believed that a bimetallic construct of lithium and a metal from the second group of metals reacts with the impurities according to a reaction which for aluminum proceeds as follows.

$(2x+y+7)H_2O+4Li+2Li_xAl \rightarrow (x+5)H_2\uparrow+Al_2O_3 \cdot yH_2O\Downarrow + (2x+4)LiOH\Downarrow$ In the preferred embodiment of the invention, the lithium and the second metal are electrically connected to one another by placing them in direct physical contact with one another in a bimetallic layered construction. Preferably, thin layers of lithium and the second metal are provided and pressed together into an integral sheet by a conventional rolling mill. The layers take several different forms. For example, in one embodiment the layers may be in the form of thin foils. In another embodiment, such foils may be perforated to improve electrical contact and adhesion. In yet another embodiment, the layers may be in the form of a grid.

The layered bimetallic sheet is placed in the electrolyte solution to purify the solution. In yet another preferred embodiment, to obtain a large surface area for reactions in a smaller volume, a strip of a layered bimetallic sheet is accordion folded or loosely wound into a spiral and then inserted into the electrolyte solution. A spiral-wound, layered bimetallic sheet is illustrated in FIG. 1. A first foil 11 of lithium is pressed to a second foil 12 of aluminum to then form a bimetallic sheet. The sheet is loosely wound into a spiral. Such a construction provides a high surface area for the purification reactions.

In another embodiment, the lithium and the second metal are placed in electrical contact with one another by a short circuit made of a third metal. The third metal should be a metal that will not intercalate lithium. Preferred metals include titanium, iron, nickel, copper and alloys such as stainless steel which contain one or more of these metals.

Figure 2:
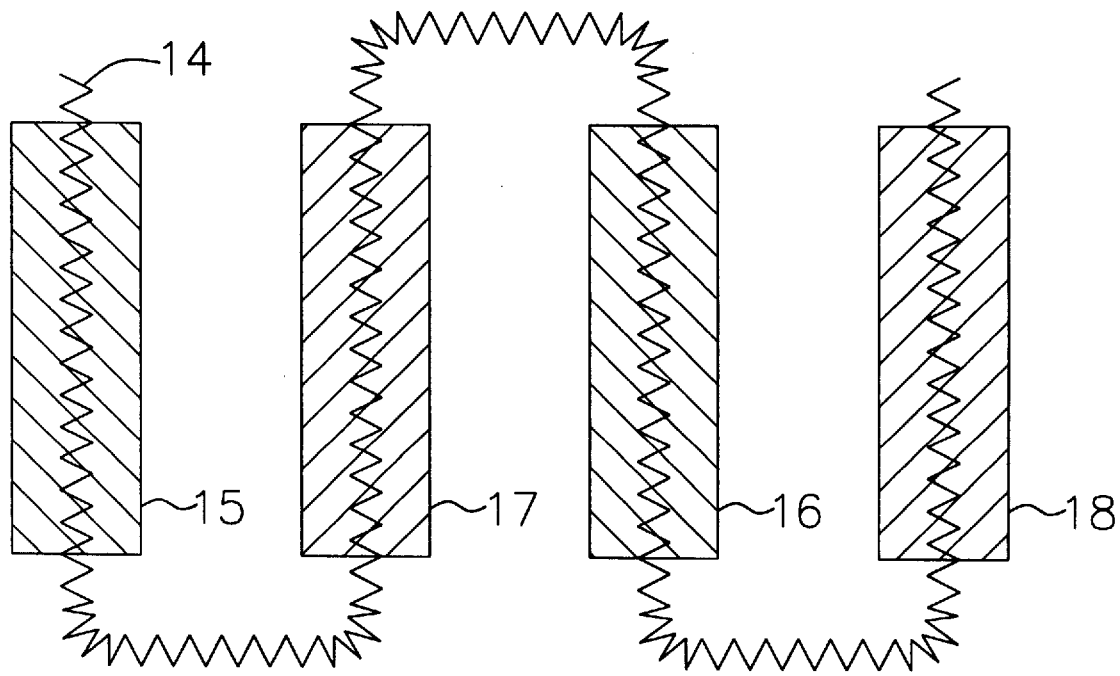

If the lithium and the second metal are joined by a third metal to form a short circuit, then the lithium and second metal are preferably provided on one or more grids made from the third metal. For example, a pair of stainless steel grids can be used as substrates which are plated, one with lithium and the other with the second metal such as aluminum. According to yet another embodiment as illustrated in FIG. 2, a single grid 14 of a sheet of stainless steel is provided with alternating plated sections of lithium and aluminum. The grid includes first and second sections 15, 16 plated with lithium. Between the first and second sections plated with lithium is a third section 17 plated with aluminum. A fourth section 18, also plated with aluminum is provided such that the second section plated with lithium is between the third and fourth sections plated with aluminum. The sections of the grid are accordion-folded to produce a compact bimetallic construct. In still another embodiment, a single grid of stainless steel is plated on one side pith lithium and the other side with aluminum.

While grids may be used, the most preferred embodiment is the use of a layered bimetallic sheet of lithium and the second metal. The use of a bimetallic sheet generally provides a faster purification rate than the use of one or more grids. Furthermore, if grids are used, due to the mechanical tension that occurs during the intercalation mechanism, the alloy of lithium and the other metal can tend to become brittle and may break from the underlying stainless steel grid. The use of a bimetallic sheet of lithium and a second metal tends to prevent the breakage encountered when the metals are plated to a stainless steel substrate because the lithium tends to retain construct integrity due to its own malleability when provided as a foil.

In the most preferred embodiment, aluminum is selected as the second metal. There are several advantages to the use of aluminum. One advantage is that when aluminum is used, the reaction area increases during the intercalation reaction. This is because the lithium-aluminum alloy that is being formed during the intercalation step has a larger specific volume (0.57 cm³/g) than aluminum (0.37 cm³/g). As the intercalation reaction proceeds, the disintegration and dispersion of the aluminum results in a larger active surface area production.

Another advantage to the use of aluminum is that it reacts with water in the electrolyte solution to form an active aluminum oxide ($Al_2O_3$). Aluminum oxide is a well known absorbent for water and other impurities. Therefore, the formation of aluminum oxide still further improves the purification efficiency of the process. A further advantage of aluminum is that it can be rolled easily as a thin flexible foil. The aluminum foil may also be easily perforated to improve electrical contact and mechanical adhesion, or alternatively, the aluminum may be produced in the form of a grid. Another advantage of aluminum includes its relatively inexpensive price.

One other very important advantage of the use of aluminum is that both the starting aluminum as well as the lithium-aluminum alloy and other products formed by the purification process of the present invention are relatively safe to handle. This is in sharp contrast to the use of mercury amalgams according to prior art purification processes in which the reactants and products are highly toxic.

The invention will be described further with reference to the following examples.

EXAMPLE 1

A 1.0M electrolyte solution of $LiPF_6$ in ethylene carbonate was prepared. The $LiPF_6$ was obtained from Chameleon Chemicals and the ethylene carbonate was obtained from Mitsubishi Chemicals. The initial water content of the solution was 22 ppm (by weight).

A sheet of lithium foil 40 $\mu$m thick and a sheet of aluminum foil 25 $\mu$m thick were placed in electrical contact with one another by forcing them together in a rolling mill to produce a bimetallic layered sheet. The Lithium foil was obtained from Aldrich and the aluminum foil was obtained from Nilaco Corp. A 30 mm by 40 mm section of the bimetallic sheet and a 100 ml sample of the electrolyte solution were placed together in a pressure vessel and agitated for about 24 hours. At the end of 24 hours, the remaining sheet and other pieces of metal or other reaction products in the electrolyte solution were separated from the electrolyte solution by filtration. According to this procedure, the water content of the electrolyte solution was reduced to 11 ppm.

EXAMPLE 2

A 1.0M solution of $LiClO_4$ in dimethyl carbonate was prepared. The $LiClO_4$ was obtained from the Kishida Chemical Company Ltd. and the dimethyl carbonate was obtained from Mitsubishi Chemical. The initial water content of this electrolyte solution was measured and found to be 39 ppm. As in the first example, a 100 ml sample of the electrolyte solution was placed in a pressure vessel along with a 30 mm by 40 mm section of the sheet of bimetallic layered lithium and aluminum foils. The electrolyte solution was agitated for about 24 hours and at the end of the 24 hour period the remaining foil and any other reaction products were separated from the electrolyte solution by filtration. The water content of this second electrolyte solution was found to have been reduced by the process to 10 ppm.

EXAMPLE 3

A third electrolyte solution was prepared of 1.0M $LiClO_4$ in propylene carbonate. The $LiClO_4$ was obtained from the Kishida Chemical Company Ltd. and the propylene carbonate was obtained from Mitsubishi Chemical. The initial water content of the solution was measured and found to be 165 ppm.

A 100 ml sample Of this solution was placed in a pressure vessel along with a 30 mm by 40 mm section of the sheet of bimetallic layered lithium and aluminum f oils. The electrolyte solution was agitated in the pressure vessel for about 72 hours. After that, the remaining metal sheet and any reaction products were separated from the electrolyte solution by filtration. According to this purification procedure, the water content had been reduced to 20 ppm.

The unpurified and purified electrolyte solutions of this example were then tested against one another in a battery cell. A sealed 2016 coin cell was used as the cell testing vehicle. The coin cell casing was made from stainless steel The surface area of each electrode was 2 cm$^2$. A lithium anode made from a lithium ribbon was pressed on expanded stainless steel that had been welded to the internal surface of the cover of the coin cell.

The cathode was made from a porous tablet comprising a mixture of 85.5% of $V_2O_5$, 4.5% of Denka black and 10% of PTFE. The $V_2O_5$ was obtained from the Aldrich Chemical Company. A Celgard 2400 polypropylene microporous membrane from Celanese Corporation was used as the separator. The positive electrode had a mass of 0.2 grams and the negative electrode had a mass of 0.008 grams.

For each of the two samples of electrolyte solution the cells were discharged and charged repeatedly at 50° C. The discharge current was 2 mA and the discharge cutoff voltage was 1.8 V. For the test the maximum discharge cutoff time was 5 hours. The charge was carried out at 1 mA to a 3.8 V cutoff.

According to this test, the cell with the unpurified electrolyte solution had a significantly higher internal resistance. Moreover, the accumulated discharge capacity after ten cycles for the cell with the unpurified electrolyte solution was only 6.02 mA hours. In effect, the battery using the unpurified electrolyte solution was unusable by the tenth cycle. In contrast, the cell with the purified electrolyte solution produced 76.34 mA hours of accumulated discharge capacity after ten cycles.

It is believed that for the unpurified electrolyte solution, the surface of the lithium electrode was passivated by the impurities' decomposition products. This passivation was responsible for the low accumulated discharge capacity.

The purification procedure as described above is useful for any organic based electrolyte solution used in any lithium or lithium ion battery which is kinetically stable to the lithium containing anode materials.

What is claimed is:

1. A method for removing impurities from a lithium battery electrolyte solution comprising a lithium salt solute in an organic solution, the method comprising the steps of:
    placing lithium and a second metal with which lithium is capable of intercalation in electrical contact with one another to form a bimetallic construct;
    placing the bimetallic construct in contact with the lithium battery electrolyte solution to convert the impurities into reaction products and form a purified electrolyte solution; and
    separating the bimetallic construct and reaction products from the purified electrolyte solution.

2. The method of claim 1 wherein the lithium and the second metal are placed in direct physical contact with one another.

3. The method of claim 1 further comprising the step of continually bringing new portions of the electrolyte solution into contact with the surfaces of the bimetallic construct.

4. The method of claim 3 further comprising the step of filtering the purified electrolyte solution.

5. The method of claim 1 wherein the second metal is selected from the group consisting of magnesium, aluminum, zinc, gallium, silver, cadmium, indium, tin, antimony, platinum, gold, lead and bismuth.

6. The method of claim 1 wherein the lithium and second metal are provided as a layered construct.

7. The method of claim 6 wherein at least one of the lithium and second metal layers is provided in the form of a foil.

8. The method of claim 7 wherein the foil is perforated.

9. The method of claim 6 wherein at least one of the lithium and second metal layers is provided in the form of a grid.

10. The method of claim 6 wherein the second metal is aluminum.

11. The method of claim 1 further comprising the step of electrically connecting the lithium and the second metal by a short circuit of a third metal.

12. The method of claim 11 wherein the third metal is selected from the group consisting of titanium, iron, nickel, copper and alloys thereof.

13. The method of claim 12 further comprising the step of providing lithium and the second metal on a grid of the third metal.

14. The method of claim 13 wherein the grid is made from stainless steel and the lithium and the second metal are plated onto the grid.

15. The method of claim 1 wherein the second metal is aluminum.

16. A method for removing impurities from a lithium battery electrolyte solution comprising a lithium silt solute in an organic solution comprising the steps of:
    forming a layered bimetallic composition comprising a layer of lithium and a layer of a second metal with which lithium is able to intercalate, the layers being in electrical contact with one another;
    placing the electrolyte solution in contact with the bimetallic composition to convert the impurities into reaction products and form a purified electrolyte solution; and separating the bimetallic construct and reaction products from the purified electrolyte solution.

17. The method of claim 16 wherein the lithium layer and the second metal layer are placed in direct physical contact with one another.

18. The method of claim 16 further comprising the steps of:
    continually bringing new portions of the electrolyte solution into contact with the surfaces of the bimetallic composition; and
    filtering the purified electrolyte solution.

19. The method of claim 16 wherein the second metal is selected from the group consisting of magnesium, aluminum, zinc, gallium, silver, cadmium, indium, tin, antimony, platinum, gold, lead and bismuth.

20. The method of claim 16 wherein the second metal is aluminum.

21. A method for removing impurities from a lithium battery electrolyte solution comprising a lithium salt solute in an organic solution comprising the steps of:
    providing a first layer of lithium;
    providing a second layer of a second metal, the second metal able to intercalate with lithium;

electrically connecting the first and second layers with one another;

placing the electrolyte solution in contact with the first and second layers to convert the impurities into reaction products and form a purified electrolyte solution; and separating the bimetallic construct and reaction products from the purified electrolyte solution.

22. The method of claim 21 wherein the first and second layers are directly electrically connected.

23. The method of claim 21 wherein at least one of the first and the second layer is provided in the form of a foil.

24. The method of claim 23 wherein the foil is perforated.

25. The method of claim 21 wherein at least one of the first layer and the second layer is provided in the form of a grid.

26. The method of claim 21 further comprising the steps of:

continually bringing new portions of the electrolyte solution into contact with the surfaces of the first and second layers; and filtering the electrolyte solution.

27. The method of claim 21 wherein the electrical connection step comprises the step of pressing the first and second layers against one another.

28. The method of claim 21 wherein the second metal is selected from the group consisting of magnesium, aluminum, zinc, gallium, silver, cadmium, indium, tin, antimony, platinum, gold, lead and bismuth.

29. The method of claim 21 wherein the second metal is aluminum.

30. A method for removing impurities from a lithium battery electrolyte solution comprising a lithium salt solute in an organic solution comprising the steps of:

bringing the solution into contact simultaneously with lithium and a second metal with which lithium can intercalate to convert the impurities into reaction products and form a purified electrolyte solution; and separating the purified electrolyte solution from the lithium, the second metal and the reaction products.

31. The method of claim 1 wherein the impurity is water.
32. The method of claim 16 wherein the impurity is water.
33. The method of claim 21 wherein the impurity is water.
34. The method of claim 30 wherein the impurity is water.

\* \* \* \* \*